United States Patent Office 3,034,996
Patented May 15, 1962

3,034,996
PREPARATION OF LOW DENSITY
POLYURETHANE FOAM
Melvin Kaplan, Tonawanda, N.Y., assignor to Allied
Chemical Corporation, New York, N.Y., a corporation of New York
No Drawing. Filed June 12, 1959, Ser. No. 819,836
7 Claims. (Cl. 260—2.5)

This invention relates to low density cellular polyurethane products and to the preparation thereof. More particularly this invention relates to rigid polyurethane foams comprising a high proportion of closed cells filled with a fluorinated aliphatic hydrocarbon gas and to processes for the preparation of such foams.

Polyurethane copolymer cellular products have become important in such fields of application as household appliances, airplane construction, truck bodies, home construction and the like. Particularly in such applications wherein the foamed product is utilized to impart insulating character the excellent thermal properties of the polyurethane copolymers is a valuable asset.

Polyurethane foams are generally prepared by reacting a polyisocyanate with an active hydrogen-containing material in the presence of a blowing agent. It is known to use as the blowing agent, fluorinated aliphatic saturated hydrocarbons and it is known also to vary the density of the foamed product by varying the amount of blowing agent. It is obvious that the less dense products are to be preferred for reasons of economy of materials.

Previous attempts at preparing low cost, low density, rigid foams utilizing fluorinated aliphatic hydrocarbon blowing agents have been only moderately successful. Foams having a density of about 2 lbs./cu. ft. have been prepared using about 20% by weight of the blowing agent. Increasing the amount of blowing agent in an effort to decrease the density of the resulting foam results in an unsatisfactory product, i.e. one of poor dimensional stability and/or poor compression strength, and/or very coarse cell structure, and/or in the extreme case, complete collapse of the foam.

It is therefore an object of this invention to devise low density polyurethane cellular products characterized by good dimensional stability and good compression strength containing fluorinated aliphatic saturated hydrocarbons. Another object is to provide a method for the production of low density polyurethane cellular products of good dimensional stability and good compression strength. These and other objects will be obvious from the following description of the present invention.

The foamed composition of this invention comprises the product of reacting a polyisocyanate, an active hydrogen-containing substance which reacts with the polyisocyanate, at least 40%, preferably 50-70%, by weight of the active hydrogen-containing material of a fluorinated aliphatic saturated hydrocarbon and organic additives specified hereinafter which permit the utilization of a surprisingly increased amount, as much as 90% or more, of a blowing agent without sacrifice of important physical characteristics of the resultant foamed product.

It has been found that certain organic compounds possess the ability of enabling a reacting resinous mass of the type described above to incorporate a significantly greater proportion of a fluorinated aliphatic hydrocarbon than the same reacting resinous mass from which the said organic compounds have been omitted. Although it is not known with certainty how this desirable function is accomplished, it was noted that the organic additives enable the foaming mass to remain in a frothy condition for a longer period and thus "to rise," that is to foam to a greater degree and to "accommodate" a greater proportion of the blowing agent than the same mass from which the organic additives have been omitted. The term "blowing agent accommodator" has been selected to describe the organic additives which in the present application enable a polyisocyanate reacting mass to incorporate a surprisingly larger amount of fluorinated aliphatic hydrocarbon.

According to a preferred mode of preparing the low density polyurethane cellular products of this invention, a premix comprising the active hydrogen-containing substance, polymerization catalyst and the blowing agent accommodator is prepared and to it is added a mixture of the polyisocyanate component and the blowing agent. This is thoroughly mixed and then the foaming mass is poured into a suitable mold. The heat generated by the reaction vaporizes the blowing agent causing the reaction mixture to foam and expand, filling the voids of the mold. Thereafter, the cellular product sets and is cured by standing at ambient temperature for a period of days or by heating in an oven at about 50° C. for a period of hours.

A feature of the present invention resides in the inclusion in the reaction mass of a blowing agent accommodator which permits the utilization of greater relative amounts of the blowing agent than was heretofore possible. This particular feature results in polyurethane cellular products of significantly lower density without material detriment to other physical characteristics of the foam. Amounts of accommodator as small as 2% by weight of the active hydrogen-containing constituent are generally effective in increasing the relative quantity of blowing agent which can be used. Further, 40% and more of the blowing agent accommodator often can be used with advantage. The effectiveness of the blowing agent accommodators to provide the beneficial effects of this invention will vary and consequently the optimum proportion will, in general, be different for each blowing agent accommodator. Generally speaking, this optimum value will be within the range of 10% and 30% by weight of active hydrogen-containing constituent. In no instance, however, will the amount of blowing agent accommodator required to obtain a low density, i.e. a density in the approximate range of 1 lb./cu. ft., foam be in excess of 60% by weight of the reaction mass.

The blowing agent accommodators which enable such a rigid foam formulation to tolerate an increased amount of fluorinated hydrocarbon blowing agent are divided into two classes as follows:

(1) Triaryl and trialkyl esters of phosphorus acids such as—
  Tricresyl phosphate
  Tris (chloroethyl) phosphate
  Tris (chloroethyl) phosphite
  Tris (bromoethyl) phosphite
  Triphenyl phosphate
  Tri (chlorophenyl) phosphate (2) Polyesters having a hydroxyl number of less than 70 such as—
  Acetyl tributyl citrate
  Methyl phthalyl ethyl glycollate
  Diethyl adipate
  Dibutyl phthalate
  Dibutyl adipate
  Diethyl phthalate
  Polyester from adipic acid, diethylene glycol and trimethylolethane ("PFR-4")-hydroxyl number of 65.

The preferred class of blowing agent accommodators is group (1)—triaryl and trialkyl esters of phosphorus acid; of this group, tris (chloroethyl) phosphate ("Celluflex CEF") because of its general effectiveness, ready availability and relatively reasonable cost is the preferred accommodator. Mixtures of these blowing agent accommodators are contemplated by this invention also.

Any of a wide variety of polyisocyanates and prepolymers thereof can be used in this copolymerization. The liquid polyisocyanates and especially liquid diisocyanates are preferred. As examples of this component the following can be mentioned:

m-Phenylene diisocyanate
2,4-tolylene diisocyanate
2,6-tolylene diisocyanate
Naphthalene-1,5-diisocyanate
4,4'-methylene-bis(phenylisocyanate)
1,6-hexamethylene diisocyanate
4,4'-methylene-bis-(cyclohexylisocyanate)
4,4',4''-triphenylmethane-triisocyanate
1,3,5-benzene triisocyanate Mixtures of the above and equivalent materials are contemplated also.

Additionally, and in the present instance preferably, a prepolymer, and especially a fluid prepolymer, based on a polyisocyanate can be used. It is known to prepare a reactive prepolymer of a polyisocyanate and an active hydrogen-containing substance, such as a polyol, said prepolymer containing one or the other component in excess and being capable of further reaction with a material containing reactive groups of the type contained by the component used in lesser quantity. Preferably in the present instance, a prepolymer containing reactive isocyanato groups is used. Such a prepolymer is one prepared by reacting 10 parts of a polyol, e.g. hexanetriol, with 100 parts of a mixture of 80 parts of 2,4-tolylene diisocyanate and 20 parts of 2,6-tolylene diisocyanate. Likewise, so-called "quasi-prepolymers" such as the reaction products prepared by condensing 1 part of a polyester such as "PFR-6" (adipic acid, trimethylolpropane polyester) and 4.4 parts of "Nacconate 80" can be used.

The active hydrogen-containing component can be selected from among a wide variety of such compounds which include polyesters, polyamides, and the like. Examples of such compounds include:

Polyesters such as the reaction product of adipic acid, phthalic anhydride and trimethylolpropane ("PFR-7") having a low acid number (below 10), a high hydroxyl number (above 400) and being essentially free of water. Comparable polyesters such as are obtained by known procedures from polybasic acids such as sebacic, glutaric, phthalic, halogenated phthalic, hydrogenated phthalic, succinic, maleic, fumaric and the like, with polyols such as ethylene glycol, glycerol, sorbitol, polypropylene glycol and the like, can be used also.

The preferred active hydrogen-containing components are polyesters having a hydroxyl number of 300 to 600 and a molecular weight of 1000 to 3000.

Mixtures of these active hydrogen-containing components are contemplated herein also.

The fluorinated aliphatic saturated hydrocarbon used as the blowing agent in these novel compositions can be one or a mixture of the group of compounds exemplified by the following particular members:

Trichloromonofluoromethane
Dichlorodifluoromethane
Monochlorotrifluoromethane
Trichlorotrifluoroethane
Dichlorotetrafluoroethane
Tetrachlorodifluoroethane
1,1-difluoroethane
1,1,1-chlorodifluoroethane These blowing agents are all characterized by being liquids or gases at normal temperatures and pressures, poor solvents for the organic copolymer, and boiling at temperatures below that generated by the copolymerization reaction, a temperature usually not in excess of about 175° C. These agents, preferably, have a significant solubility in the polyisocyanate component and when in gaseous state have a molecular size such that they do not diffuse readily through the interstices of the copolymer molecules at ambient temperatures. Such compounds are commercially available under the trade designations of "Genetrons."

The invention will be illustrated by the following examples which include the preferred modes of carrying out the invention. Parts are by weight and temperatures are given in degrees centigrade.

EXAMPLE 1

*Improved Low Density Foam Containing Blowing Agent Accommodator*

To a mixture consisting of 100 parts of "PFR-6" Polyester (Adipic acid-Trimethylol propane polyester)
0.5 part "Silicone X-521" (Union Carbide Chem. Corp.)

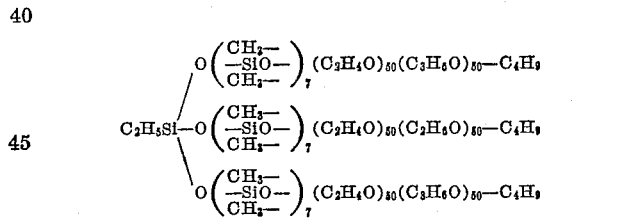

Total mol. wt.=6000 (U.S.P. 2,834,748)

2.0 parts N-methyl morpholine
30.0 parts Tricresyl phosphate a mixture of 108 parts of "Nacconate 1080H" (toluene diisocyanate-1,2,6 hexanetriol adduct) and 60 parts of "Genetron 11" (trichloromonofluoromethane) was added. The resulting mixture was agitated vigorously for thirty seconds and then poured into an open paper mold wherein the frothing mass was permitted to react and rise for about 5 minutes. The product was cured by standing at ambient temperature for about one week.

This product had a density of 1.35 lbs./cu. ft., 96% closed cells and a compressive strength of 5.9 p.s.i.

EXAMPLES 2 THROUGH 9

In an analogous manner to Example 1, low density polyurethane cellular products were prepared using blowing agent accommodators as indicated in Table I below. For comparison the percent closed cell and compressive strength and shrinkage were determined (in most instances). None of these products showed significant dimensional change ("shrinkage") when cured at ambient temperature.

TABLE I

| Ex. | Blowing Agent Accommodator | Parts | "Genetron 11" | Density, lbs./cu. ft. | Percent Closed Cells | Compressive Strength | Shrinkage, Percent |
|---|---|---|---|---|---|---|---|
| 2 | "Celluflex CEF" | 20 | 60 | 1.37 | 91 | 7.3 | None |
| 3 | "Celluflex CEF" | 30 | 70(C) | 1.27 | 9..5 | 5.0 | 0.5 |
| 4 | {"Tetronic 304" / Tricresyl phosphate} | 30 / 15 | 71 | 1.23 | | 4.6 | |
| 5 | {"Tetronic 304" / "Celluflex CEF"} | 30 / 15 | 71 | 1.21 | | 4.2 | |
| 6 | "Celluflex CEF" | 22.7 | 90(A) | 1.20 | 92.5 | | |
| 7 | {"Celluflex CEF" / "Quadrol"} | 30.0 / 7.6 | 90(B) | 1.10 | 94.0 | | |
| 8 | Diethyl adipate | 20 | 60 | 1.4 | 96.0 | 3.5 | 3 |
| 9 | Dibutyl phthalate | 20 | 60 | 1.5 | 97.0 | 4.5 | 3 |

Legend:
(A)—1 part "Silicone X-521" used.
(B)—1 part "Silicone X-521" and 120 parts of "Nacconate 1080H" used.
(C)—2 parts triethylamine used as catalyst ("Quadrol" is N,N,N',N'-tetra(hydroxypropyl) ethylenediamine)
"Tetronic 304" has the formula

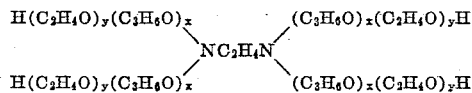

Mol. wt. of ethylene diamine-propylene oxide base is between 501–1000, and in which the oxyethylene content is between 40 and 49% by weight. The total mol. wt. of Tetronic 304 is about 1700.

From the above illustrative examples, it can be readily seen that low density polyurethane cellular products having high strength have been provided and further that a unique and commercially feasible procedure for obtaining such products has been devised.

This development which is characterized by the incorporation of surprisingly large quantities of fluorinated aliphatic hydrocarbons in the polyurethane copolymer mass in the presence of a blowing agent accommodator, makes possible the economical and effective production of insulating members in various fields of construction.

The copolymerizable compositions of this invention may, and usually do, contain other ingredients than the polyisocyanate, active hydrogen-containing material, blowing agent accommodator and fluorinated aliphatic hydrocarbon. Thus such adjuvants as emulsifiers, polymerization catalysts, activators, pigments, fillers, extenders, and the like can be present. In general, the formulation, curing and further treatment of the cellular products of this invention will, in view of the above discussion, be obvious to those skilled in the art and no extended discussion of these collateral aspects of this invention is believed necessary.

I claim:

1. A method for producing low density cellular polyurethane products having a high proportion of closed cells filled with a fluorinated aliphatic hydrocarbon gas and characterized by good dimensional stability and good compression strength by reacting an organic polyisocyanate with an active hydrogen-containing substance which is the reaction product of polyhydric alcohol and polycarboxylic acid, the improvement which comprises effecting the reaction in the presence of a fluorinated aliphatic saturated hydrocarbon blowing agent in an amount of at least 40% to about 90% by weight of the active hydrogen-containing material and in the presence of 2–60% by weight of the active hydrogen-containing material of an ester selected from the group consisting of a triaryl ester of phosphorous acid, a trialkyl ester of phosphorus acid, said esters of phosphorus containing 6–21 carbon atoms, and an organic ester containing only C, O and H and having 2–3 esterified carboxy groups and having a hydroxyl number of less than 70.

2. A method for producing low density cellular polyurethane products having a high proportion of closed cells filled with a fluorinated aliphatic hydrocarbon gas and characterized by good dimensional stability and good compression strength by reacting an organic polyisocyanate with an active hydrogen-containing substance which is the reaction product of polyhydric alcohol and polycarboxylic acid, the improvement which comprises effecting the reaction in the presence of a fluorinated aliphatic saturated hydrocarbon blowing agent in an amount of 50–70% by weight of the active hydrogen-containing material and in the presence of an ester selected from the group consisting of a triaryl ester of phosphorus acid, a trialkyl ester of phosphorus acid, said esters of phosphorus acid containing 6–21 carbon atoms, and an organic ester containing only C, O and H and having 2–3 esterified carboxy groups and having a hydroxyl number of less than 70 in an amount within the range of 10–30% by weight of active hydrogen-containing constituent.

3. A method for producing low density cellular polyurethane products having a high proportion of closed cells filled with a fluorinated aliphatic hydrocarbon gas and characterized by good dimensional stability and good compression strength by reacting an organic polyisocyanate with an active hydrogen-containing substance which is the reaction product of polyhydric alcohol and polycarboxylic acid, the improvement which comprises effecting the reaction in the presence of a fluorinated aliphatic saturated hydrocarbon blowing agent in an amount of at least 40% to about 90% by weight of the active hydrogen-containing material and in the presence of a triaryl ester of phosphorus acid having 18–21 carbon atoms in an amount of 2–60% by weight of active hydrogen-containing material.

4. A method for producing low density cellular polyurethane products having a high proportion of closed cells filled with a fluorinated aliphatic hydrocarbon gas and characterized by good dimensional stability and good compression strength by reacting an organic polyisocyanate with an active hydrogen-containing substance which is the reaction product of polyhydric alcohol and polycarboxylic acid, the improvement which comprises effecting the reaction in the presence of a fluorinated aliphatic saturated hydrocarbon blowing agent in an amount of at least 40% to about 90% by weight of the active hydrogen-containing material and in the presence of a trialkyl ester of phosphorous acid having 6 carbon atoms in an amount of 2–60% by weight of active hydrogen-containing material.

5. A method for producing low density cellular polyurethane products having a high proportion of closed cells filled with a fluorinated aliphatic hydrocarbon gas and characterized by good dimensional stability and good compression strength by reacting an organic polyisocyanate with an active hydrogen-containing substance which is the reaction product of polyhydric alcohol and polycarboxylic acid, the improvement which comprises effecting the reaction in the presence of a fluorinated aliphatic saturated hydrocarbon blowing agent in an amount of at least 40% to about 90% by weight of the active hydrogen-containing material and in the presence of an organic ester containing only C, O and H and having 2–3 esterified carboxy groups and having a hydroxyl number of less than 70 in an amount of 10–30% by weight of active hydrogen-containing materials.

6. A method for producing low density cellular polyurethane products having a high proportion of closed cells filled with a fluorinated aliphatic hydrocarbon gas and characterized by good dimensional stability and good compression strength which comprises reacting toluene diisocyanate, a polyester which is the reaction product of polyhydric alcohol and polycarboxylic acid and having a hydroxyl number of 300–600 and a molecular weight of 1,000–3,000, 50–70% trichloromonofluoromethane as blowing agent based on the weight of said polyester and 10–30% tris (trichloroethyl) phosphtae based on the weight of said polyester.

7. A method for producing low density cellular polyurethane products having a high proportion of closed cells filled with a fluorinated aliphatic hydrocarbon gas and characterized by good dimensional stability and good compression strength which comprises reacting toluene diisocyanate, a polyester which is the reaction product of polyhydric alcohol and polycarboxylic acid and having a hydroxyl number of 300–600 and a molecular weight of 1,000–3,000, 50–70% trichloromonofluoromethane as blowing agent based on the weight of said polyester and 10–30% tricresyl phosphate based on the weight of said polyester.

References Cited in the file of this patent
UNITED STATES PATENTS

| 2,577,281 | Simon et al. | Dec. 4, 1951 |
| 2,811,493 | Simon et al. | Oct. 29, 1957 |

FOREIGN PATENTS

| 1,161,239 | France | Mar. 17, 1958 |

OTHER REFERENCES

Barringer: "Rigid Urethane Foams–11 Chemistry and Formulations," Du Pont Elastomers Chem. Dept. Bul. HR–26, April 1958, pages 13, 14, 26 and 27.

Margedant: "Freon-Blown Rigid Foams," Dupont Elastomers Chem. Dept. Bul. HR–31, July 1958, pages 1–5.